United States Patent [19]
Loepfe

[11] 3,844,498
[45] Oct. 29, 1974

[54] APPARATUS FOR EVALUATING THE WINDING SPEED OF CROSS-WINDERS

[75] Inventor: Erich Loepfe, Zollikerberg, Switzerland

[73] Assignee: Aktiengesellschaft Gebruder Loepfe, Wetzikon, Switzerland

[22] Filed: July 19, 1973

[21] Appl. No.: 380,688

Related U.S. Application Data
[62] Division of Ser. No. 143,776, May 17, 1971, Pat. No. 3,774,860.

[30] Foreign Application Priority Data
May 28, 1970 Switzerland.......................... 8012/70

[52] U.S. Cl............................ 242/36, 28/64, 242/37
[51] Int. Cl............................................. B65h 63/00
[58] Field of Search...... 242/36, 37, 35.5 R, 35.6 R; 28/64

[56] References Cited
UNITED STATES PATENTS
3,476,329  11/1969  Felix..................................... 242/36

*Primary Examiner*—Stanley N. Gilreath
*Attorney, Agent, or Firm*—Werner W. Kleeman

[57] ABSTRACT

Equipment for use on a cross-winding machine comprising a speed evaluation apparatus cooperating with a winding unit of the cross-winding machine and incorporating electromagnetic pulse generator means and an electronic pulse space-evaluation circuit arrangement operatively coupled with the pulse generator means. The pulses generated by the pulse generator means are delivered to the electronic pulse space-evaluation circuit arrangement. The pulse space-evaluation circuit arrangement contains a circuit for generating sawtooth voltages, the amplitude of which is proportional to the spacing in time of each two successive pulses. This pulse space-evaluation circuit arrangement further contains circuit means operatively coupled with the circuit for generating sawtooth voltages, said circuit means generating a step-shaped output signal, the height of whose last step indicates the momentary rotational speed. There is further provided a yarn cleaning device having means for scanning the traveling yarn, a thickness measuring channel, and an adjustable length measuring channel, both said channels being operatively coupled to the output of the scanning means for generating yarn thickness and yarn defect length indicating signals, respectively. Circuit means are operatively coupled to the output of said evaluating means for adjusting the sensitivity of the adjustable length measuring channel.

5 Claims, 6 Drawing Figures

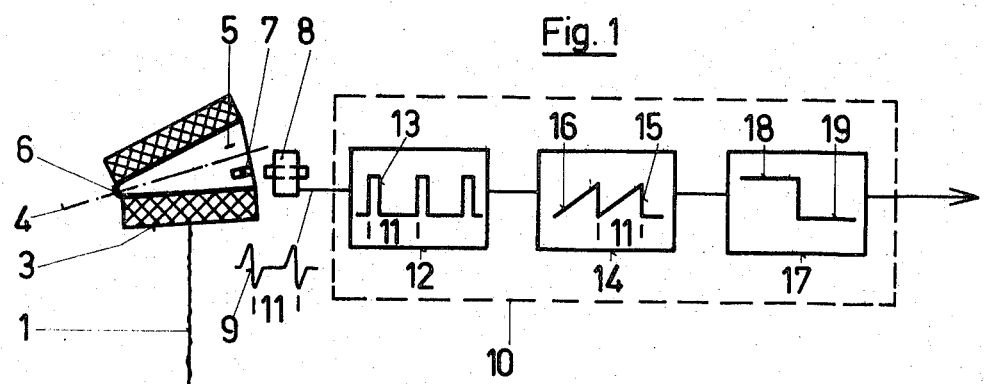
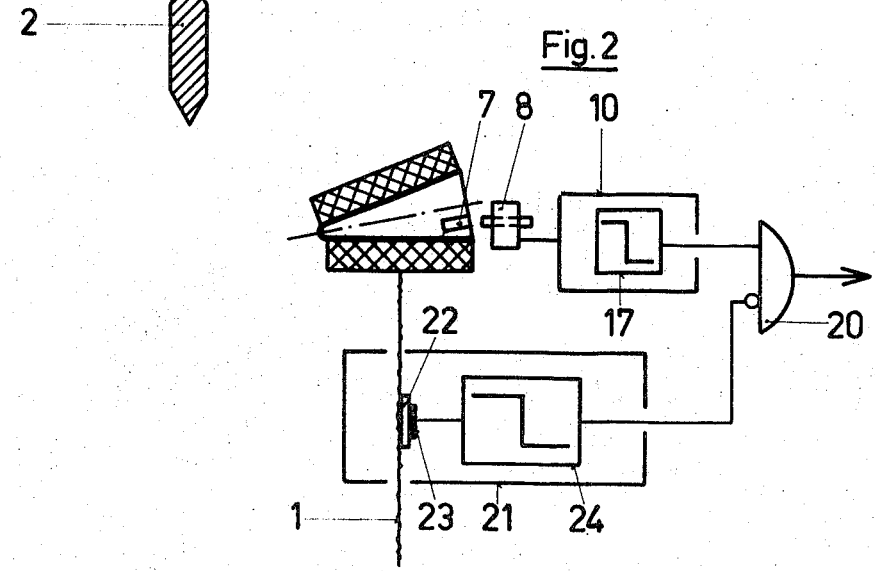
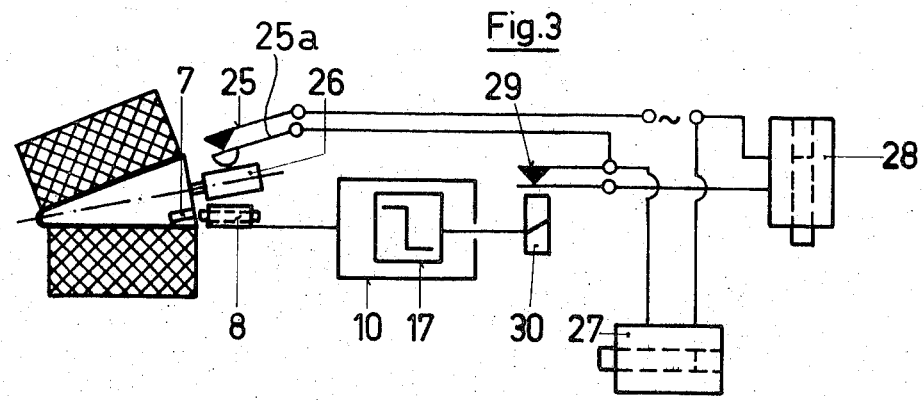

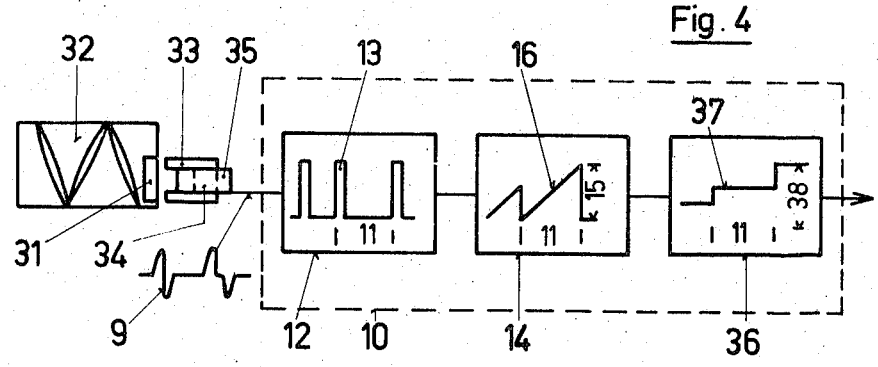
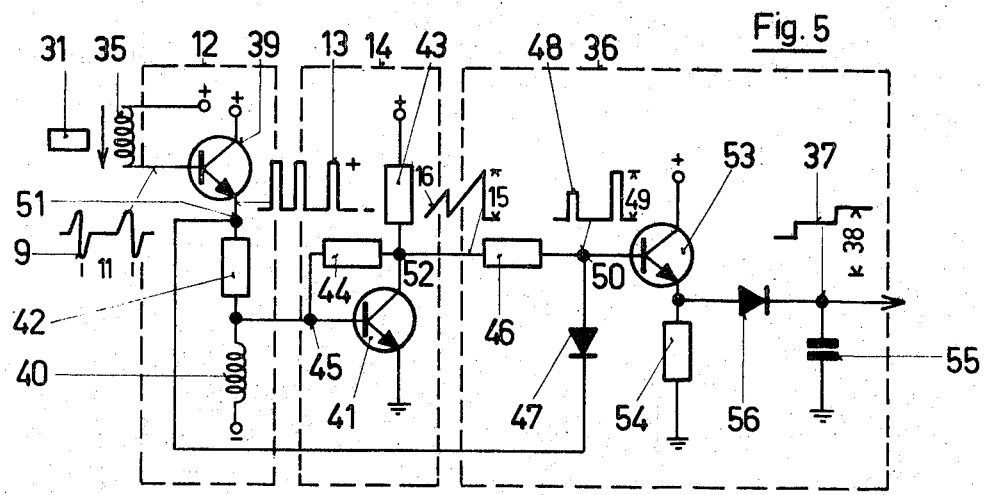
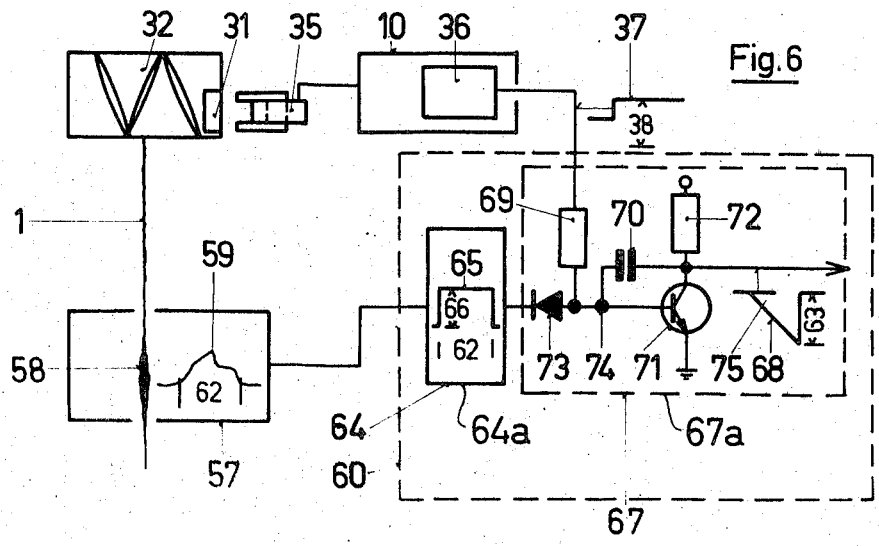

APPARATUS FOR EVALUATING THE WINDING SPEED OF CROSS-WINDERS

CROSS-REFERENCE TO RELATED CASE

This is a divisional application of my copending, commonly assigned U.S. application, Ser. No. 143,776, filed May 17, 1971, now U.S. Pat. No. 3,774,860 and entitled "Apparatus For Evaluating The Winding Speed Of Cross-Winders."

BACKGROUND OF THE INVENTION

The present invention relates to new and improved apparatus for evaluating the spooling or winding speed of textile machines, in particular cross-winders, and also pertains to controlling the operation of such cross-winders and the auxiliary or additional devices arranged thereat, especially yarn cleaners.

According to one prior art proposal the occurrence of undesired yarn cutting operations during the start-up and running-out of the winding operation are prevented by electronic yarn cleaners which generate a signal, by means of a velocity or speed discriminator, and which signal is dependent upon the speed of movement of the spooled or wound yarn. This signal is then used to control the sensitivity of a yarn cleaner. In accordance with a specific constructional manifestation of this state-of-the-art proposal an electrical contact is briefly actuated at least once during each revolution of the grooved drum driving the cross-wound bobbin. A storage capacitor connected in parallel to this electrical contact is charged through a resistor and each time that the electrical contact is actuated this capacitor is again discharged. Through the use of a RC-element the thus obtained voltage is smoothed. In this manner there is produced a control signal which for a rated or nominal rotational speed is relatively small and which increases during start-up and running-out of the cross-wound bobbin. By means of this control signal it is possible to improve the determination of thickened yarn sections of greater length at the electronic yarn cleaners and, further, it is possible to prevent response of the yarn cleaner to short, tolerable yarn defects at lower winding speeds.

SUMMARY OF THE INVENTION

However, there is still present a need in the art for improved equipment for evaluating in a much more precise and reliable manner the winding speed of cross-winding machines. Therefor, a primary object of this invention is to provide just such type equipment which effectively and reliably fulfills the existing need in the art.

Another and more specific object of this invention is directed towards the provision of novel apparatus for evaluating the winding speed at cross-winding textile machines, which can be used for controlling different functions of additional equipment or devices mounted at the machine and the cross-winder itself, and furthermore, wherein there is overcome the disadvantages existent with the use of mechanically actuated contacts for generating a control signal, and moreover, wherein the apparatus of the invention, in particular, enables carrying out a more exact evaluation of the winding speed.

Still a further significant object of the present invention relates to apparatus for evaluating the winding speed of cross-winders which is relatively simple in construction, economical to manufacture, reliable in operation, not readily subject to breakdown, and provides for extremely acurate evaluation of the winding speed at such cross-winders.

Now, in order to implement these and still further objects of the invention, which will become more readily apparent as the description proceeds the inventive apparatus is generally manifested by the features that there is provided an electro-magnetic pulse generator which cooperates with the winding elements of the machine. The pulses produced by the pulse generator are delivered to an electronic pulse space-evaluation circuit arrangement. This evaluation circuit arrangement contains a circuit for producing a sawtooth voltage, the amplitude of which is proportional to the spacing in the time of each two successive pulses, this evaluation circuit arrangement also containing a bistable circuit which switches or flips as soon as the sawtooth voltage has reached a certain amplitude.

In accordance with a preferred manifestation of the invention the output signal of the pulse space-evaluation circuit arrangement is delivered to the length measuring channel of an electronic yarn cleaner, in order to compensate the influence of the winding speed upon the length scale of the length measuring channel. In this way it is possible to ensure that the yarn cleaner will always uniformly respond to the length of the defect present at the yarn independently of the winding speed.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic showing of a first embodiment of inventive apparatus equipped with a pulse interval- or pulse space-evaluation circuit;

FIG. 2 illustrates the cooperation of the apparatus of FIG. 1 with a so-called tribo electrical or frictional electrical yarn monitor;

FIG. 3 illustrates the cooperation of the apparatus of FIG. 1 with a diameter-sensing device for the purpose of triggering an exchange operation for the cross-wound bobbin;

FIG. 4 illustrates a further embodiment of inventive apparatus employing a modified pulse space-evaluation circuit arrangement;

FIG. 5 is a detailed circuit diagram of the evaluation circuit arrangement of FIG. 4; and FIG. 6 illustrates the cooperation of the apparatus depicted in FIGS. 4 and 5 with a yarn cleaner in order to compensate the influence of the winding speed upon the length measuring channel of such yarn cleaner.

DETAILED DESCRIPTION OF THE PREFERRED EMBODIMENTS

Turning now to the drawings, it will be understood that for the purpose of simplifying the illustration only enough of the actual textile machine, with which the evaluation apparatus of the invention is advantageously employed, has been shown in order to enable one versed in the art to fully understand the underlying concepts of the present invention. Hence, in the exemplary embodiment depicted in FIG. 1 the yarn 1 is wound from the wind-off spool or cop 2 onto the wind-up spool 3 typically referred to as the cross-wound bobbin. This cross-wound bobbin is driven by a conventional grooved drum, such as the grooved drum 32 of FIG. 4 so that it rotates about its axis 4. The cross-wound bobbin or wind-up bobbin or spool 3 together with the associated groove drum 32 form a winding unit or winding elements for the textile machine. The core 5 onto which there is placed the bobbin sleeve 6 rotates together with the cross-wound bobbin 3. A permanent magnet 7 is mounted within the core 5 and a stationary solenoid 8 is mounted at the winder. Each time that the permanent magnet 7 moves past the solenoid or coil 8 a voltage pulse 9 is induced in the solenoid 8. Permanent magnet 7 together with solenoid 8 form an electromagnetic pulse generator.

Now, this pulse generator 7, 8 is electrically coupled with a pulse space- or pulse interval-evaluation circuit arrangement 10. At the pulse space-evaluation circuit arrangement 10 there is measured the time-spacing, in other words the spacing with time, as indicated by reference character 11, of each two successive pulses 9. For this purpose, the pulses 9 are transformed at a pulse shaper 12 into square wave or rectangular pulses which are well defined as concerns their length and amplitude. The pulse shaper 12 may be, for instance, a monostable multivibrator or an amplifier stage which is controlled to saturation.

Thereafter the pulses 13 arrive at the sawtooth circuit 14 where with conventional means there is generated a sawtooth-shaped voltage curve 16, with the amplitude 15 of each sawtooth pulse proportional to the associated pulse spacing 11.

The sawtooth voltage 16 is then applied to the bistable circuit 17 which flips or switches from one voltage condition, indicated at 18, into the other voltage condition, indicated at 19, as soon as the voltage 16 has attained a predetermined amplitude value. Circuit 17 can be, for instance, a bistable multivibrator.

The output voltage of the bistable circuit 17 can be delivered to a relay or a logical circuit, in order to act upon, through the agency of amplifier means and electro-mechanical devices, such as magnetic switches, the mechanism of the winder or its auxiliary devices, such as yarn cleaner, yarn monitor, and so forth.

In the embodiment of FIG. 2 there is illustrated the manner in which the output of the bistable circuit 17 is coupled with the output of a yarn monitoring device 21 equipped with a tribo electrical or frictional electrical transducer. Tribo electrical or frictional electrical transducers suitable for the purposes of the invention are well known in the art, as for instance taught in Swiss Patent No. 479,478. It will be seen more particularly that, on the one hand, the output voltage of the circuit 17 and, on the other hand, the output voltage of the frictional electrical yarn monitoring device 21 are applied to an anti-coincidence gate 20. Now at the frictional electrical yarn monitoring device 21 the traveling yarn 1 generates at the friction element 22 fluctuations in potential which characterize themselves in the form of a noise voltage, conducted by means of an electrode 23 to a yarn monitoring circuit 24. This yarn monitoring circuit 24 transforms the noise voltage into a direct-current voltage in such a manner that if a noise voltage is present a steady or constant direct-current voltage is delivered at the output. If the yarn is stationary or absent then the noise voltage disappears and likewise the direct-current voltage. Thus at the output of the anti-coincidence gate 20 there only then appears a voltage which is different from null if, firstly, the frictional-electrical yarn monitoring device is not in an excited state, and secondly if at the same time the pulse spacing or pulse interval at the electro-magnetic pulse generator 7, 8 does not exceed a predetermined threshold value, that is to say, if the winding speed is still above a predetermined value. The output signal of the anti-coincidence gate, then, actuates via a relay and electro-magnetic means the automatic knotting device of the cross-winder.

The apparatus provides advantages for cross-winders of the type equipped with an automatic stopping- and exchange device for the full cross-wound bobbins. In such machines the drive mechanism of the cross-wound bobbin is automatically switched-off when the wound package has reached a certain size in diameter. Owing to its inertia the cross-wound bobbin will nonetheless still continue to rotate for a certain period of time and within this interval yarn is continued to be wound-up. If no specific measures are provided then, each time upon reaching a condition of complete standstill, the yarn monitor will undesirably trigger the automatic knotter. It must be remembered that the yarn monitor alone cannot determine whether the yarn is actually ruptured or whether it is standing still because the cross-wound bobbin has been stopped for exchange purposes.

Now if in accordance with the circuitry of FIG. 2 the output of the frictional-electrical yarn monitoring device or yarn monitor 21 is logically coupled with the output of the bistable circuit 17 in the indicated manner with the aid of the anti-coincidence gate 20, then, during yarn rupture or upon depletion of the cop it is also possible to carry out the knotting operation during the running-out phase and up to directly prior to the actual standstill of the cross-wound bobbin. The frictional-electrical yarn monitoring device is particularly suitable for this apparatus because it is capable of always delivering a clean signal characteristic of yarn travel even when the yarn is moving at relatively low speeds and extensively independently of the yarn material and yarn thickness. Consequently, it is possible to maintain at a low value the critical winding speed at which the bistable circuit 17 switches or flips, and the phase of operation where knotting is no longer automatic can be practically neglected.

According to a modification of the embodiment of FIG. 2 the logical coupling operation, instead of using an anti-coincidence gate, can be carried out by means of two relays which are connected in the output lines of the bistable circuit 17 and the frictional-electrical yarn monitoring device 21. It is also possible to carry out coupling by mechanical elements which, for instance, are actuated by electro-magnets; the electro-magnets then will be energized by the circuits 10 and 24.

In accordance with the embodiment of FIG. 3 the inventive apparatus can be advantageously used at cross-winders equipped with automatic bobbin exchange mechanisms, so that when the cross-wound bobbin is full there can be initiated within the shortest possible time exchange of such full cross-wound bobbin. Therefore, it will be seen that in FIG. 3 there is provided a diameter-feeler mechanism 25 which, upon attaining a predetermined diameter of the cross-wound bobbin, shuts down its drive and prepares the automatic bobbin exchange mechanism. In this exemplary arrangement the apparatus of the invention is constructed in such a fashion that the bistable circuit 17 only then switches or flips directly prior to standstill of the cross-wound package and thus delivers a command to the automatic bobbin exchange mechanism for carrying out the bobbin exchange operation which has been prepared by the diameter-feeler mechanism 25.

As best seen by referring to FIG. 3 this diameter-feeler mechanism 25 embodies a pair of contacts 25a which are closed by the bobbin carrier 26 when the cross-wound package has attained the desired diameter. As a result, an electromagnet 27 is energized, this electromagnet then stopping the drive of the cross-wound bobbin. A further electromagnet 28 which triggers the automatic bobbin exchange operation, on the other hand, is only then excited if also the pair of contacts 29 are closed by a second relay 30. Closing of the pair of contacts 29 takes place at such time as the bistable circuit 17 switches upon falling below the critical winding speed.

By virtue of coupling the scanning of the diameter of the cross-wound bobbin, by means of the pair of contacts 25a, with the actuation of the pair of contacts 29, measures have been provided to ensure that the exchange of the cross-wound bobbin will be undertaken directly after the full bobbin has been brought to standstill.

In similar type operating apparatuses of the prior art the drive of the cross-wound package is shutdown through the action of a diameter-feeler mechanism and after a fixed time interval the cross-wound bobbin is exchanged. However, the time required for running-out of the bobbin depends upon different factors, such as yarn material, winding speed, diameter of the full bobbin, bearing friction, temperature and other variable parameters, and accordingly, there must be provided a sufficiently large time reserve for the aforementioned time interval. Yet the efficiency of the winder drops by an amount corresponding to this time reserve.

Now in the embodiment of FIG. 4 a piece of ferromagnetic material, for instance a soft iron piece 31, is mounted at the grooved drum 32. Two permanent magnets 33 are arranged at a soft iron core 34 about which there is wound a solenoid or coil 35. The solenoid 35 is penetrated by the magnetic flux of the permanent magnets 33. This magnetic flux changes each time that the soft iron piece 31 moves past the permanent magnets 34, and thus, similar to the embodiment of FIG. 1, here also pulses 9 are induced at the solenoid 35. Therefore, in this exemplary embodiment the electromagnetic pulse generator consists of the moved iron piece 31, the fixedly mounted permanent magnets 33, the iron core 34 and the solenoid 35.

Just as was the case with the arrangement of FIG. 1 here also the generated pulses 9 are delivered to a pulse space-evaluation circuit arrangement 10 where these pulses are transformed at the pulse shaper 12 into clean rectangular or square wave pulses 13, and at the circuit 14 the square wave pulses 13 are formed into a sawtooth voltage 16.

This sawtooth voltage 16 is delivered to a holding circuit 36. Holding circuit 36 holds or retains the voltage amplitude 15 which is present during the period of time of arrival of a pulse 13 until the time period of arrival of a next pulse 13. Therefore, at the holding circuit 36 there is formed a stepped voltage 37 wherein the height of the step 38 corresponds in each instance to the last amplitude 15 of the sawtooth voltage 16. This amplitude again is proportional to the associated pulse spacing 11.

Now with the circuit arrangement depicted in FIG. 5 the iron piece 31 induces pulses 9 in the coil or solenoid 35. At the pulse shaper 12 and by means of a transistor 39 a magnetic field is built up in an inductance 40 by virtue of each pulse 9. The thus induced voltage is used at the sawtooth circuit 14 to control a transistor 41 up to saturation. A resistor 42 serves to limit the current flow. An amplifier stage formed of the transistor 41 and a work resistor 43 is markedly feedback coupled via the resistor 44, this amplifier stage functioning as an operational amplifier and virtually ground potential appearing at the base 45. It is for this reason that during the pulse gaps the magnetic field at the inductance 40 slowly decays and produces at the collector of the transistor 41 the desired sawtooth voltage 16, the amplitude 15 of which is proportional to the corresponding pulse spacing 11.

FIG. 5 further shows the construction of the holding circuit 36 which has been shown in block form in FIG. 4. Now with the aid of a resistor 46 and a diode 47 at the intermediate junction 50 there is formed a rectangular or square wave voltage 48 from the sawtooth voltage 16, the amplitude 49 of the square wave voltage 48 corresponding to the last amplitude 15 of the sawtooth voltage 16. During the pulse gaps of the square wave voltage 13 the junction point 50 disposed intermediate the resistor 46 and the transistor 53 is maintained by the diode 47, which is conductive during this phase, at negative potential. Now if a pulse 13 appears at junction 51 of the pulse shaper 12 then the diode 47 is blocked, and the intermediate junction point 50 assumes the potential of the junction point 52 of the sawtooth circuit 14. A capacitor 55 us charged by an emitter follower formed from the transistor 53 and the resistor 54. A diode 56 prevents discharge of the capacitor 55 during the intervals or gaps between the square wave pulses 48. The amplitude 38 appearing at the capacitor 55 is equal to the amplitude 49 of the momentarily prevailing last rectangular or square wave pulse 48, so that the circuit 36 delivers the required stepped voltage 37.

Now in accordance with the embodiment of FIG. 6 by means of the stepped voltage 37 it is possible to influence the length measurements of yarn feelers in an electronic yarn cleaner 57, 60 which embodies both a yarn thickness measuring channel as well as also a length measuring channel, briefly also referred to as length channel, the mode of influencing such length measurements being undertaken in such a manner that with increasing voltage 38 the length scale of the length channel is enlarged. This measure is necessary for the following reasons: the yarn defects which are to be eliminated by the electronic yarn cleaner 57, 60 require not only measuring the thickness or cross-section of the yarn but also the length of the yarn section containing the defect. This length measurement is predicated upon measuring the time which expires between the throughpassage of the beginning of the yarn defect and the end of the yarn defect. With the known yarn cleaners the length of the measured time interval is not only dependent upon the length of the defect but also upon the speed of movement of the yarn. During the starting-up phase and the running-out phase of winding process it can happen that otherwise harmless or meaningless short irregularities which appear in the yarn seem longer by virtue of such scale change and are undesirably cut-out or eliminated by the yarn cleaner, resulting in superfluous knotting operations and downtimes at the winder.

Now with the circuitry of FIG. 6 the scanning or feeler head 57 of the electronic yarn cleaner delivers, by virtue of a throughpassing yarn defect 58, an electrical signal in the form of a pulse 59. Pulse 59 is supplied to the yarn cleaner circuit 60. The length channel 64, 67 of the yarn cleaner circuit 60 is assigned the function of determining the duration 62 of the pulse 59 and delivering this result in the form of a voltage amplitude 63. To that end, at the input portion 64a of the length channel 64, 67 the pulse 59 is transformed into a rectangular or square wave pulse 65 of the same length 62 and an amplitude 66 which is randomly the same for all pulses 65. This can be done, for instance, with the aid of a Schmitt-trigger. At the second portion 67a of the length channel 64,67 and with the aid of a Miller-integrator the length 62 of the pulse 65 is measured and presented in the form of the amplitude 63 of the triangular pulse 68. The Miller-integrator consists of a resistor 69, a Miller-capacitor 70 and an amplifier composed of the transistor 71 and the working resistor 72. Now the input 74 of the Miller-integrator is opened and closed by means of a diode 73 in rhythm with the square wave pulse 65. Upon the presence of a pulse 65 the terminal of the capacitor 70 which is connected to the side of the collector of the transistor 71 is discharged with a constant current by means of such transistor 71 so that a triangular pulse possessing the amplitude 63 appears. The slope 75 of the flank 68 of the triangular pulse is dependent upon the voltage delivered to the free terminal of the resistor 69. If this free end or terminal of resistor 69 is connected with the output of the holding circuit 36, then, the last amplitude 38 which momentarily appears of the stepped voltage 37 determines the flank slope 75 and therefore the amplitude 63 which, in turn, determines the length measuring scale of the length channel, that is the ratio of the amplitude 63 to the length 62 of the pulse 65. There is thus obtained the required dependency of the length measuring scale upon the winding speed in the manner that during larger, in other words during the operational winding speed the length measuring scale is small in comparison to the length measuring scale during lower winding speeds, as such prevail during start-up and running-out of the winder.

The described apparatus can be constructed as a robust and operationally reliable unit, and which furthermore can be installed at existing winders without any great expenditure. It is sufficient to utilize a small permanent magnet 7 or a small iron piece 31 in order to establish an operationally reliable coupling between the winding unit or mechanism 5, 32 and therefore the yarn on the one hand and the electronic evaluation circuit arrangement 10 on the other hand. At the electromagnetic pulse generator the magnetic field directly influences the current flow of an electrical circuit, that is to say, there is present a direct transformation of the magnetic field energy into electrical energy in that a magnetic field which varies in its intensity owing to the rotational movement of the elements of the winding unit produces current pulses. Thus, there are not used any magnetic-mechanical means, such as Reed contacts or mechanical means such as cam switches. Apart from the previously considered means which operate according to the laws of inductivity it is within the purview of the inventive concept to use other electromagnetic transducers, such as Hall-generators and similar magnetic field-sensitive semiconductor devices.

The inventive apparatus is advantageously constructed in such a manner that it is insensitive to dust, fiber fly and dirt and requires practically no maintenance. In winders which rely upon coupling-out the grooved drum in order to stop a winding station or winding unit it is advantageous to install the electromagnetic pulse generator at the grooved drum. Owing to the variable diameter of the cross-wound bobbin or package the rotational speed of the grooved drum constitutes a more exact measurement for the yarn speed than the rotational speed of the cross-wound bobbin itself. Experience has shown, however that an electromagnetic pulse generator coupled with the cross-wound bobbin and equipped with the associated pulse space-evaluation circuit arrangement, also delivers an evaluation of the yarn speed which is sufficiently accurate for many purposes.

While there is shown and described present preferred embodiments of the invention, it is to be distinctly understood that the invention is not limited thereto, but may be otherwise variously embodied and practiced within the scope of the following claims. Accordingly,

What is claimed is:

1. Equipment for use on a cross-winding machine provided with at least one winding unit embodying a wind-up bobbin for receiving a traveling yarn drawn from a yarn supply position, and means for driving such wind-up bobbin, the equipment comprising, in combination;

a speed evaluation apparatus cooperating with said winding unit of the cross-winding machine, said evaluation apparatus comprising electromagnetic pulse generator means cooperating with said winding unit of the cross-winding machine for generating pulses indicating the rotational speed of the wind-up bobbin, an electronic pulse space-evaluation circuit arrangement operatively coupled with said pulse generator means, the pulses generated by said pulse generator means being delivered to said electronic pulse space-evaluation circuit arrangement, said pulse space-evaluation circuit arrangement containing a circuit for generating sawtooth voltages, the amplitude of which is proportional to the spacing in time of each two successive pulses, said pulse space-evaluation circuit arrangement further containing circuit means operatively coupled with said circuit for generating sawtooth voltages, said circuit means generating a step-shaped output signal, the height of whose last step indicates the momentary rotational speed of said wind-up bobbin;

a yarn cleaning device having means for scanning the traveling yarn, a thickness measuring channel, and an adjustable length measuring channel, both said channels being operatively coupled to the output of the scanning means for generating yarn thickness and yarn defect length indicating signals, respectively; and circuit means operatively coupled to the pulse space-evaluation circuit arrangement and to said adjustable length measuring channel whereby said step-shaped output signal adjusts the sensitivity of said length measuring channel and, therefore, the yarn defect length indicating signals.

2. Equipment as defined in claim 1, wherein said circuit means includes a capacitor and an emitter follower incorporating a transistor and a resistor.

3. Equipment as defined in claim 2, further including a diode and a resistor in circuit with said transistor for producing square wave pulses from said sawtooth voltages.

4. Equipment as defined in claim 3, further including diode means in circuit with said capacitor for blocking discharge of said capacitor during the gap intervals of said square wave pulses.

5. Equipment for use on a cross-winding machine provided with at least one winding unit embodying a wind-up bobbin for receiving a traveling yarn drawn from a yarn supply position, and means for driving such wind-up bobbin, the equipment comprising, in combination:

a speed evaluation apparatus cooperating with said winding unit of the cross-winding machine, said evaluation apparatus comprising electromagnetic pulse generator means cooperating with said winding unit of the cross-winding machine for generating pulses indicating the rotational speed of the wind-up bobbin, an electronic pulse space-evaluation circuit arrangement operatively coupled with said pulse generator means, the pulses generated by said pulse generator means being delivered to said electronic pulse space-evaluation circuit arrangement, said pulse space-evaluation circuit arrangement containing a circuit for generating sawtooth voltages, the amplitude of which is proportional to the spacing in time of each two successive pulses, said pulse space-evaluation circuit arrangement further containing circuit means operatively coupled with said circuit for generating sawtooth voltages, said circuit means generating a step-shaped output signal, the height of whose last step indicates the momentary rotational speed of said wind-up bobbin;

a yarn cleaning device having means for scanning the traveling yarn, square wave generating means connected to said yarn scanning device for responding to presence of a yarn defect by producing a square wave signal having a duration related to the yarn defect length, means connected to said square wave generating means for integrating said square wave and thereby generating a triangular pulse having a base line related to the time duration of said square wave signal, said means for integrating comprising a Miller-capacitor and a current determining resistor, and circuit means connected for coupling said pulse space evaluation circuit to said current determining resistor, whereby the slope of the said triangular pulse is related at least in part to the amplitude of said step-shaped output signal.

2. a second voltage measuring device coupled for producing an output signal representing the voltage developed across said resistor under each section occupancy condition, and

* * * * *